United States Patent
Shepelev et al.

(10) Patent No.: US 10,175,827 B2
(45) Date of Patent: Jan. 8, 2019

(54) DETECTING AN ACTIVE PEN USING A CAPACITIVE SENSING DEVICE

(71) Applicant: Synaptics Incorporated, San Jose, CA (US)

(72) Inventors: Petr Shepelev, San Jose, CA (US); Adam Schwartz, Redwood City, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 249 days.

(21) Appl. No.: 14/581,683

(22) Filed: Dec. 23, 2014

(65) Prior Publication Data

US 2016/0179226 A1 Jun. 23, 2016

(51) Int. Cl.
*G06F 3/0354* (2013.01)
*G06F 3/044* (2006.01)

(52) U.S. Cl.
CPC .......... *G06F 3/044* (2013.01); *G06F 3/03545* (2013.01); *G06F 2203/04108* (2013.01)

(58) Field of Classification Search
CPC ..... G06F 3/044; G06F 3/0416; G06F 3/03545
See application file for complete search history.

(56) References Cited

U.S. PATENT DOCUMENTS

| | | | |
|---|---|---|---|
| 4,087,625 A | 5/1978 | Dym et al. | |
| 4,233,522 A | 11/1980 | Grummer et al. | |
| 4,237,421 A | 12/1980 | Waldron | |
| 4,264,903 A | 4/1981 | Bigelow | |
| 4,293,987 A | 10/1981 | Gottbreht et al. | |
| 4,484,026 A | 11/1984 | Thornburg | |
| 4,492,958 A | 1/1985 | Minami | |
| 4,550,221 A | 10/1985 | Mabusth | |
| 4,550,310 A | 10/1985 | Yamaguchi et al. | |
| 4,659,874 A | 4/1987 | Landmeier | |
| 4,667,259 A | 5/1987 | Uchida et al. | |
| 4,677,259 A | 6/1987 | Abe | |
| 4,705,919 A | 11/1987 | Dhawan | |
| 4,771,138 A | 9/1988 | Dhawan | |
| 4,878,013 A | 10/1989 | Andermo | |

(Continued)

FOREIGN PATENT DOCUMENTS

| | | |
|---|---|---|
| CN | 2436978 Y | 6/2001 |
| CN | 1490713 A | 4/2004 |

(Continued)

OTHER PUBLICATIONS

PCT international search report and written opinion of PCT/US2012/054005 dated Jan. 3, 2013.

(Continued)

*Primary Examiner* — Kevin M Nguyen

(74) *Attorney, Agent, or Firm* — Patterson + Sheridan, LLP

(57) ABSTRACT

In an example, a processing system for an integrated display and capacitive sensing device includes a sensor module and a determination module. The sensor module includes sensor circuitry configured to be coupled to a plurality of sensor electrodes. The sensor module is configured to receive an active pen signal with at least one sensor electrode of the plurality the sensor electrodes. The determination module is configured to adjust a sensing period of the sensor module for alignment with a transmission period of the active pen signal.

24 Claims, 6 Drawing Sheets

(56) References Cited

U.S. PATENT DOCUMENTS

| | | |
|---|---|---|
| 4,954,823 A | 9/1990 | Binstead |
| 4,999,462 A | 3/1991 | Purcell |
| 5,053,715 A | 10/1991 | Andermo |
| 5,062,916 A | 11/1991 | Aufderheide et al. |
| 5,093,655 A | 3/1992 | Tanioka et al. |
| 5,239,307 A | 8/1993 | Andermo |
| 5,341,233 A | 8/1994 | Tomoike et al. |
| 5,392,058 A | 2/1995 | Tagawa |
| 5,459,463 A | 10/1995 | Gruaz et al. |
| 5,463,388 A | 10/1995 | Boie et al. |
| 5,534,892 A | 7/1996 | Tagawa |
| 5,650,597 A | 7/1997 | Redmayne |
| 5,657,012 A | 8/1997 | Tait |
| 5,777,596 A | 7/1998 | Herbert |
| 5,841,078 A | 11/1998 | Miller et al. |
| 5,869,790 A | 2/1999 | Shigetaka et al. |
| 5,896,120 A | 4/1999 | Iguchi et al. |
| 6,054,979 A | 4/2000 | Sellers |
| 6,188,391 B1 | 2/2001 | Seely et al. |
| 6,219,113 B1 | 4/2001 | Takahara |
| 6,222,522 B1 | 4/2001 | Mathews et al. |
| 6,239,788 B1 | 5/2001 | Nohno et al. |
| 6,256,022 B1 | 7/2001 | Manaresi et al. |
| 6,281,888 B1 | 8/2001 | Hoffman et al. |
| 6,288,707 B1 | 9/2001 | Philipp |
| 6,297,811 B1 | 10/2001 | Kent et al. |
| 6,307,751 B1 | 10/2001 | Bodony et al. |
| 6,320,394 B1 | 11/2001 | Tartagni |
| 6,362,633 B1 | 3/2002 | Tartagni |
| 6,380,930 B1 | 4/2002 | Van Ruymbeke |
| 6,452,514 B1 | 9/2002 | Philipp |
| 6,459,044 B2 | 10/2002 | Watanabe et al. |
| 6,486,862 B1 | 11/2002 | Jacobsen et al. |
| 6,512,381 B2 | 1/2003 | Kramer |
| 6,535,200 B2 | 3/2003 | Philipp |
| 6,560,276 B1 | 5/2003 | Long et al. |
| 6,583,632 B2 | 6/2003 | Von Basse et al. |
| 6,653,736 B2 | 11/2003 | Kishimoto et al. |
| 6,731,120 B2 | 5/2004 | Tartagni |
| 6,771,327 B2 | 8/2004 | Sekiguchi |
| 6,825,833 B2 | 11/2004 | Mulligan et al. |
| 6,879,930 B2 | 4/2005 | Sinclair et al. |
| 6,910,634 B1 | 6/2005 | Inose et al. |
| 6,937,031 B2 | 8/2005 | Yoshioka et al. |
| 6,998,855 B2 | 2/2006 | Tartagni |
| 7,031,886 B1 | 4/2006 | Hargreaves |
| 7,129,935 B2 | 10/2006 | Mackey |
| 7,158,125 B2 | 1/2007 | Sinclair et al. |
| 7,218,314 B2 | 5/2007 | Itoh |
| 7,306,144 B2 | 12/2007 | Moore |
| 7,327,352 B2 | 2/2008 | Keefer et al. |
| 7,339,579 B2 | 3/2008 | Richter et al. |
| 7,348,967 B2 | 3/2008 | Zadesky et al. |
| 7,382,139 B2 | 6/2008 | Mackey |
| 7,388,571 B2 | 6/2008 | Lowles et al. |
| 7,423,219 B2 | 9/2008 | Kawaguchi et al. |
| 7,423,635 B2 | 9/2008 | Taylor et al. |
| 7,439,962 B2 | 10/2008 | Reynolds et al. |
| 7,455,529 B2 | 11/2008 | Fujii et al. |
| 7,522,230 B2 | 4/2009 | Lee |
| 7,548,073 B2 | 6/2009 | Mackey et al. |
| 7,554,531 B2 | 6/2009 | Baker et al. |
| 7,589,713 B2 | 9/2009 | Sato |
| 7,633,566 B2 | 12/2009 | Utsunomiya et al. |
| 7,663,607 B2 | 2/2010 | Hotelling et al. |
| 7,724,243 B2 | 5/2010 | Geaghan |
| 7,768,273 B1 | 8/2010 | Kalnitsky et al. |
| 7,786,981 B2 | 8/2010 | Proctor |
| 7,808,255 B2 | 10/2010 | Hristov et al. |
| 7,812,825 B2 | 10/2010 | Sinclair et al. |
| 7,821,274 B2 | 10/2010 | Philipp et al. |
| 7,821,502 B2 | 10/2010 | Hristov |
| 7,859,521 B2 | 12/2010 | Hotelling et al. |
| 7,864,160 B2 | 1/2011 | Geaghan et al. |
| 7,876,309 B2 | 1/2011 | XiaoPing |
| 7,973,771 B2 | 7/2011 | Geaghan |
| 7,977,953 B2 | 7/2011 | Lee |
| 7,986,152 B2 | 7/2011 | Philipp et al. |
| 8,040,326 B2 | 10/2011 | Hotelling et al. |
| 8,059,015 B2 | 11/2011 | Hua et al. |
| 8,125,463 B2 | 2/2012 | Hotelling et al. |
| 8,243,027 B2 | 8/2012 | Hotelling et al. |
| 8,258,986 B2 | 9/2012 | Makovetskyy |
| 8,259,078 B2 | 9/2012 | Hotelling et al. |
| 8,278,571 B2 | 10/2012 | Orsley |
| 8,305,359 B2 | 11/2012 | Bolender et al. |
| 8,319,747 B2 | 11/2012 | Hotelling et al. |
| 8,482,536 B1 | 7/2013 | Young |
| 9,164,641 B1* | 10/2015 | Rowe .................... G06F 3/044 |
| 2002/0077313 A1 | 6/2002 | Clayman |
| 2003/0052867 A1 | 3/2003 | Shigetaka et al. |
| 2003/0103043 A1 | 6/2003 | Mulligan et al. |
| 2003/0234771 A1 | 12/2003 | Mulligan et al. |
| 2004/0062012 A1 | 4/2004 | Murohara |
| 2004/0077313 A1 | 4/2004 | Oba et al. |
| 2004/0095336 A1 | 5/2004 | Hong et al. |
| 2004/0125087 A1 | 7/2004 | Taylor et al. |
| 2004/0217945 A1 | 11/2004 | Miyamoto et al. |
| 2004/0222974 A1 | 11/2004 | Hong et al. |
| 2004/0239650 A1 | 12/2004 | Mackey |
| 2004/0252109 A1 | 12/2004 | Trent et al. |
| 2005/0030048 A1 | 2/2005 | Bolender et al. |
| 2005/0135492 A1 | 6/2005 | Jia et al. |
| 2006/0012575 A1 | 1/2006 | Knapp et al. |
| 2006/0038754 A1 | 2/2006 | Kim |
| 2006/0097991 A1 | 5/2006 | Hotelling et al. |
| 2006/0114240 A1 | 6/2006 | Lin |
| 2006/0114241 A1 | 6/2006 | Lin |
| 2006/0114247 A1 | 6/2006 | Brown |
| 2006/0232600 A1 | 10/2006 | Kimura et al. |
| 2007/0008299 A1 | 1/2007 | Hristov |
| 2007/0026966 A1 | 2/2007 | Sanchez |
| 2007/0074914 A1 | 4/2007 | Geaghan et al. |
| 2007/0222762 A1 | 9/2007 | Van Delden et al. |
| 2007/0229466 A1 | 10/2007 | Peng et al. |
| 2007/0229468 A1 | 10/2007 | Peng et al. |
| 2007/0229469 A1 | 10/2007 | Seguine |
| 2007/0229470 A1 | 10/2007 | Snyder et al. |
| 2007/0242054 A1 | 10/2007 | Chang et al. |
| 2007/0257894 A1 | 11/2007 | Philipp |
| 2007/0262962 A1 | 11/2007 | XiaoPing et al. |
| 2007/0262963 A1 | 11/2007 | Xiao-Ping et al. |
| 2007/0262966 A1 | 11/2007 | Nishimura et al. |
| 2007/0268265 A1 | 11/2007 | XiaoPing |
| 2007/0273659 A1 | 11/2007 | XiaoPing et al. |
| 2007/0273660 A1 | 11/2007 | XiaoPing |
| 2007/0279395 A1 | 12/2007 | Philipp et al. |
| 2007/0291009 A1 | 12/2007 | Wright et al. |
| 2008/0006453 A1 | 1/2008 | Hotelling |
| 2008/0007534 A1 | 1/2008 | Peng et al. |
| 2008/0018581 A1 | 1/2008 | Park et al. |
| 2008/0048989 A1 | 2/2008 | Yoon et al. |
| 2008/0055267 A1 | 3/2008 | Wu et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0074398 A1 | 3/2008 | Wright |
| 2008/0104655 A1 | 5/2008 | Hayward |
| 2008/0111795 A1 | 5/2008 | Bollinger |
| 2008/0117182 A1 | 5/2008 | Um et al. |
| 2008/0144743 A1 | 6/2008 | Alderson et al. |
| 2008/0150901 A1 | 6/2008 | Lowles et al. |
| 2008/0150906 A1 | 6/2008 | Grivna |
| 2008/0158172 A1 | 7/2008 | Hotelling et al. |
| 2008/0158181 A1 | 7/2008 | Hamblin et al. |
| 2008/0164076 A1 | 7/2008 | Orsley |
| 2008/0180407 A1 | 7/2008 | Utsunomiya et al. |
| 2008/0218488 A1 | 9/2008 | Yang et al. |
| 2008/0245582 A1 | 10/2008 | Bytheway |
| 2008/0246723 A1 | 10/2008 | Baumbach |
| 2008/0259044 A1 | 10/2008 | Utsunomiya et al. |
| 2008/0264699 A1 | 10/2008 | Chang et al. |
| 2008/0265914 A1 | 10/2008 | Matsushima |

(56) References Cited

U.S. PATENT DOCUMENTS

| | | |
|---|---|---|
| 2008/0297176 A1 | 12/2008 | Douglas |
| 2008/0308323 A1 | 12/2008 | Huang et al. |
| 2008/0309625 A1 | 12/2008 | Krah et al. |
| 2008/0309627 A1 | 12/2008 | Hotelling et al. |
| 2008/0309628 A1 | 12/2008 | Krah et al. |
| 2008/0309635 A1 | 12/2008 | Matsuo |
| 2009/0002337 A1 | 1/2009 | Chang |
| 2009/0002338 A1 | 1/2009 | Kinoshita et al. |
| 2009/0009194 A1 | 1/2009 | Seguine |
| 2009/0040191 A1 | 2/2009 | Tong et al. |
| 2009/0046077 A1 | 2/2009 | Tanaka et al. |
| 2009/0046205 A1 | 2/2009 | Strasser et al. |
| 2009/0079707 A1 | 3/2009 | Kaehler et al. |
| 2009/0091551 A1 | 4/2009 | Hotelling et al. |
| 2009/0096757 A1 | 4/2009 | Hotelling et al. |
| 2009/0107737 A1 | 4/2009 | Reynolds et al. |
| 2009/0128518 A1 | 5/2009 | Kinoshita et al. |
| 2009/0135151 A1 | 5/2009 | Sun |
| 2009/0153509 A1 | 6/2009 | Jiang et al. |
| 2009/0160461 A1 | 6/2009 | Zangl et al. |
| 2009/0160682 A1 | 6/2009 | Bolender et al. |
| 2009/0185100 A1 | 7/2009 | Matsuhira et al. |
| 2009/0195511 A1 | 8/2009 | Cites et al. |
| 2009/0201267 A1 | 8/2009 | Akimoto et al. |
| 2009/0207154 A1 | 8/2009 | Chino |
| 2009/0213082 A1 | 8/2009 | Ku |
| 2009/0213534 A1 | 8/2009 | Sakai |
| 2009/0236151 A1 | 9/2009 | Yeh et al. |
| 2009/0256818 A1 | 10/2009 | Noguchi et al. |
| 2009/0262096 A1 | 10/2009 | Teramoto |
| 2009/0267916 A1 | 10/2009 | Hotelling |
| 2009/0273571 A1 | 11/2009 | Bowens |
| 2009/0273573 A1 | 11/2009 | Hotelling |
| 2009/0277695 A1 | 11/2009 | Liu et al. |
| 2009/0283340 A1 | 11/2009 | Liu et al. |
| 2009/0303203 A1 | 12/2009 | Yilmaz et al. |
| 2009/0309850 A1 | 12/2009 | Yang |
| 2009/0314621 A1 | 12/2009 | Hotelling |
| 2009/0324621 A1 | 12/2009 | Senter et al. |
| 2010/0001966 A1 | 1/2010 | Lii et al. |
| 2010/0001973 A1 | 1/2010 | Hotelling et al. |
| 2010/0006347 A1 | 1/2010 | Yang |
| 2010/0013745 A1 | 1/2010 | Kim et al. |
| 2010/0013800 A1 | 1/2010 | Elias et al. |
| 2010/0019780 A1 | 1/2010 | Bulea |
| 2010/0044122 A1 | 2/2010 | Sleeman et al. |
| 2010/0045635 A1 | 2/2010 | Soo |
| 2010/0053380 A1 | 3/2010 | Ise |
| 2010/0060591 A1 | 3/2010 | Yousefpor et al. |
| 2010/0066692 A1 | 3/2010 | Noguchi et al. |
| 2010/0085324 A1 | 4/2010 | Noguchi et al. |
| 2010/0090979 A1 | 4/2010 | Bae |
| 2010/0110040 A1 | 5/2010 | Kim et al. |
| 2010/0134422 A1 | 6/2010 | Borras |
| 2010/0140359 A1 | 6/2010 | Hamm et al. |
| 2010/0144391 A1 | 6/2010 | Chang et al. |
| 2010/0147600 A1 | 6/2010 | Orsley |
| 2010/0149108 A1 | 6/2010 | Hotelling et al. |
| 2010/0156839 A1 | 6/2010 | Ellis |
| 2010/0163394 A1 | 7/2010 | Tang et al. |
| 2010/0182273 A1 | 7/2010 | Noguchi et al. |
| 2010/0188359 A1 | 7/2010 | Lee |
| 2010/0193257 A1 | 8/2010 | Hotelling et al. |
| 2010/0194695 A1 | 8/2010 | Hotelling et al. |
| 2010/0194696 A1 | 8/2010 | Chang et al. |
| 2010/0194697 A1 | 8/2010 | Hotelling et al. |
| 2010/0194698 A1 | 8/2010 | Hotelling et al. |
| 2010/0214247 A1 | 8/2010 | Tang et al. |
| 2010/0214262 A1 | 8/2010 | Ishizaki et al. |
| 2010/0220075 A1 | 9/2010 | Kuo et al. |
| 2010/0225612 A1 | 9/2010 | Ishizaki et al. |
| 2010/0252335 A1 | 10/2010 | Orsley |
| 2010/0258360 A1 | 10/2010 | Yilmaz |
| 2010/0265210 A1 | 10/2010 | Nakanishi et al. |
| 2010/0271330 A1 | 10/2010 | Philipp |
| 2010/0277433 A1 | 11/2010 | Lee et al. |
| 2010/0289765 A1 | 11/2010 | Noguchi et al. |
| 2010/0289770 A1 | 11/2010 | Lee et al. |
| 2010/0291973 A1 | 11/2010 | Nakahara et al. |
| 2010/0295804 A1 | 11/2010 | Takeuchi et al. |
| 2010/0295824 A1 | 11/2010 | Noguchi et al. |
| 2010/0302201 A1 | 12/2010 | Ritter et al. |
| 2010/0302202 A1 | 12/2010 | Takeuchi et al. |
| 2010/0309162 A1 | 12/2010 | Nakanishi et al. |
| 2010/0321043 A1 | 12/2010 | Philipp et al. |
| 2010/0321326 A1 | 12/2010 | Grunthaner et al. |
| 2010/0328239 A1 | 12/2010 | Harada et al. |
| 2010/0328255 A1 | 12/2010 | Ishizaki et al. |
| 2010/0328256 A1 | 12/2010 | Harada et al. |
| 2010/0328257 A1 | 12/2010 | Noguchi et al. |
| 2010/0328259 A1 | 12/2010 | Ishizaki et al. |
| 2010/0328274 A1 | 12/2010 | Noguchi et al. |
| 2010/0328291 A1 | 12/2010 | Ishizaki et al. |
| 2011/0006999 A1 | 1/2011 | Chang et al. |
| 2011/0007030 A1 | 1/2011 | Mo et al. |
| 2011/0018841 A1 | 1/2011 | Hristov |
| 2011/0022351 A1 | 1/2011 | Philipp et al. |
| 2011/0025635 A1 | 2/2011 | Lee |
| 2011/0025639 A1 | 2/2011 | Trend et al. |
| 2011/0042152 A1 | 2/2011 | Wu |
| 2011/0048812 A1 | 3/2011 | Yilmaz |
| 2011/0048813 A1 | 3/2011 | Yilmaz |
| 2011/0050585 A1 | 3/2011 | Hotelling et al. |
| 2011/0057887 A1 | 3/2011 | Lin et al. |
| 2011/0062969 A1 | 3/2011 | Hargreaves et al. |
| 2011/0062971 A1 | 3/2011 | Badaye |
| 2011/0063251 A1 | 3/2011 | Geaghan et al. |
| 2011/0080357 A1 | 4/2011 | Park et al. |
| 2011/0090159 A1 | 4/2011 | Kurashima |
| 2011/0096016 A1 | 4/2011 | Yilmaz |
| 2011/0102361 A1 | 5/2011 | Philipp |
| 2011/0109579 A1 | 5/2011 | Wang et al. |
| 2011/0109590 A1 | 5/2011 | Park |
| 2011/0141051 A1 | 6/2011 | Ryu |
| 2011/0169770 A1 | 7/2011 | Mishina et al. |
| 2011/0187666 A1 | 8/2011 | Min |
| 2011/0210939 A1 | 9/2011 | Reynolds et al. |
| 2011/0210940 A1 | 9/2011 | Reynolds |
| 2011/0210941 A1 | 9/2011 | Reynolds et al. |
| 2011/0242444 A1 | 10/2011 | Song |
| 2011/0248949 A1 | 10/2011 | Chang et al. |
| 2011/0267300 A1 | 11/2011 | Serban et al. |
| 2011/0267305 A1 | 11/2011 | Shahparnia et al. |
| 2011/0273391 A1 | 11/2011 | Bae |
| 2011/0298746 A1 | 12/2011 | Hotelling |
| 2012/0038585 A1 | 2/2012 | Kim |
| 2012/0044171 A1 | 2/2012 | Lee et al. |
| 2012/0050216 A1 | 3/2012 | Kremin et al. |
| 2012/0056820 A1 | 3/2012 | Corbridge |
| 2012/0102191 A1 | 4/2012 | Rabii |
| 2012/0154340 A1 | 6/2012 | Vuppu et al. |
| 2012/0218199 A1 | 8/2012 | Kim et al. |
| 2012/0313901 A1 | 12/2012 | Monson |
| 2012/0327041 A1 | 12/2012 | Harley et al. |
| 2013/0057507 A1 | 3/2013 | Shin et al. |
| 2013/0088372 A1 | 4/2013 | Lundstrum et al. |
| 2013/0162570 A1 | 6/2013 | Shin et al. |
| 2013/0207926 A1* | 8/2013 | Kremin ............... G06F 3/0383 345/174 |
| 2013/0215075 A1 | 8/2013 | Lee et al. |
| 2013/0321296 A1 | 12/2013 | Lee et al. |
| 2014/0028634 A1 | 1/2014 | Krah et al. |
| 2014/0085257 A1 | 3/2014 | Wright et al. |
| 2014/0092051 A1 | 4/2014 | Weinerth et al. |
| 2014/0184554 A1 | 7/2014 | Walley |
| 2014/0354555 A1* | 12/2014 | Shahparnia ......... G06F 3/03545 345/173 |
| 2016/0092010 A1* | 3/2016 | Agarwal ............... G06F 3/0412 345/173 |

FOREIGN PATENT DOCUMENTS

| | | |
|---|---|---|
| CN | 1940842 A | 4/2007 |
| CN | 101051256 A | 10/2007 |

(56) References Cited

FOREIGN PATENT DOCUMENTS

| | | |
|---|---|---|
| CN | 1940842 B | 5/2010 |
| EP | 0810540 A2 | 12/1997 |
| EP | 0919945 A2 | 6/1999 |
| EP | 0977159 A1 | 2/2000 |
| EP | 1892605 A2 | 2/2008 |
| EP | 1936479 A1 | 6/2008 |
| EP | 1892605 A3 | 7/2008 |
| EP | 2330493 A2 | 6/2011 |
| JP | 2002-215330 A | 8/2002 |
| JP | 2002-268768 A | 9/2002 |
| JP | 2002268786 A | 9/2002 |
| JP | 2006106853 A | 4/2006 |
| JP | 2007334606 A | 12/2007 |
| JP | 2008090623 A | 4/2008 |
| JP | 2010072581 A | 4/2010 |
| JP | 2011002947 A | 1/2011 |
| JP | 2011002948 A | 1/2011 |
| JP | 2011002949 A | 1/2011 |
| JP | 2011002950 A | 1/2011 |
| JP | 2011004076 A | 1/2011 |
| JP | 2011100379 A | 5/2011 |
| KR | 10110118065 | 1/2012 |
| TW | 200945147 A | 11/2009 |
| WO | WO-86/06551 A1 | 11/1986 |
| WO | WO-0057344 A1 | 9/2000 |
| WO | WO-0127868 A1 | 4/2001 |
| WO | WO-03019346 A1 | 3/2003 |
| WO | WO-2004045905 A2 | 6/2004 |
| WO | WO-2004046905 A3 | 8/2004 |
| WO | WO-2006054585 A1 | 5/2006 |
| WO | WO-2007003108 A1 | 1/2007 |
| WO | WO-2007012256 A1 | 2/2007 |
| WO | WO-2007102238 A1 | 9/2007 |
| WO | WO-200805050 A1 | 5/2008 |
| WO | WO-2010009655 A1 | 1/2010 |
| WO | WO-20101179465 A2 | 10/2010 |
| WO | WO-2010137727 A1 | 12/2010 |
| WO | WO-20100136932 A1 | 12/2010 |

OTHER PUBLICATIONS

International Search Report; PCT/US2013/021314 dated Jun. 25, 2013.
Quantum Research Group. "Qmatrix Technology White Paper", 2006. 4 Pages.
Lubart, et al. "One Layer Optically Transparent Keyboard for Input Display", IP.com. Mar. 1, 1979. 3 Pages.
Gary L. Barrett et al. "Projected Capacitive Touch Screens", iTouchInternational. 9 pages.
Quantum Research Application Note An—KD01. "Qmatrix Panel Design Guidelines", Oct. 10, 2002. 4 Pages.
Calvin Wang et al. "Single Side All-Point-Addressable Clear Glass Substrate Sensor Design", IP.com. Apr. 2, 2009. 3 Pages.
Tsz-Kin Ho et al. "32.3: Simple Single-Layer Multi-Touch Projected Capacitive Touch Panel", SID 09 Digest.
Johannes Schoning et al. "Multi-Touch Surfaces: A Technical Guide", Technical Report TUM-I0833. 2008.
Shawn Day. "Low Cost Touch Sensor on the Underside of a Casing", IP.com. Oct. 14, 2004.
Ken Gilleo. "The Circuit Centennial", 16 Pages.
Ken Gilleo, "The Definitive History of the Printed Circuit", 1999 PC Fab.
Hal Philipp. "Charge Transfer Sensing", vol. 19, No. 2. 1999. pp. 96-105.
Paul Leopardi, "A Partition of the Unit Sphere into Regions of Equal Area and Small Diameter", 2005.
Olivier Bau, "TeslaTouch: Electrovibration for Touch Surfaces", 2010.
Colin Holland. "SID: Single Layer Technology Boosts Capacitive Touchscreens", www.eetimes.com/General. 2011.
"Novel Single Layer Touchscreen Based on Indium", 2011.
"Mesh Patterns for Capacitive Touch or Proximity Sensors", IP.com. May 14, 2010. 3pages.
"IDT Claims World's First True Single-Layer Multi-Touch Projected Capacitive Touch Screen Technology", EE Times Europe. Dec. 8, 2010.
Tracy V. Wilson et al. "How the iPhone Works", HowStuffWorks "Multi-touch Systems". 2011.
Sunkook Kim et al. "A Highly Sensitive Capacitive Touch Sensor Integrated on a Thin-Film-Encapsulated Active-Matrix OLED for Ultrathin Displays", IEEE Transactions on Electron Devices, vol. 58, No. 10, Oct. 2011.
Mike Williams, "Dream Screens from Graphene", Technology Developed at Rice could Revolutionize Touch-Screen Displays. Aug. 2011.
ASIC Packaging Guidebook, Toshiba Corporation. (2000). 35 pages.
Fujitsu Microelectronics Limited. "IC Package." (2002). 10 pages.
PCT international search report and written opinion of PCT/US2015/055075 dated Feb. 24, 2016.

* cited by examiner

DETECTING AN ACTIVE PEN USING A CAPACITIVE SENSING DEVICE

BACKGROUND

Field of the Disclosure

Embodiments generally relate to input sensing and, in particular, to detecting an active pen using a capacitive sensing system.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Input objects can be at or near the surface of the proximity sensor device ("touch sensing") or hovering over the surface of the proximity sensor device ("proximity sensing" or "hover sensing"). Proximity sensor devices may be used to provide interfaces for the electronic system. For example, proximity sensor devices are often used as input devices for larger computing systems (such as touchpads integrated in, or peripheral to, notebook or desktop computers). Proximity sensor devices are also often used in smaller computing systems (such as touch screens integrated in cellular phones or tablet computers).

SUMMARY

Embodiments relate to detecting an active pen using a capacitive sensing system. In an embodiment, a processing system for an integrated display and capacitive sensing device includes a sensor module and a determination module. The sensor module includes sensor circuitry configured to be coupled to a plurality of sensor electrodes. The sensor module is configured to receive an active pen signal with at least one sensor electrode of the plurality the sensor electrodes. The determination module is configured to adjust a sensing period of the sensor module for alignment with a transmission period of the active pen signal.

In an embodiment, an input device integrated with a display includes a plurality of sensor electrodes and a processing system coupled to the plurality of sensor electrodes. The processing system is configured to: receive an active pen signal with at least one sensor electrode of the plurality of sensor electrodes; and adjust a sensing period of the input device for alignment with a transmission period of the active pen signal.

In an embodiment, a method of operating an input device integrated with a display includes: receiving an active pen signal with at least one sensor electrode of a plurality of sensor electrodes; and adjusting a sensing period of the input device for alignment with a transmission period of the active pen signal.

BRIEF DESCRIPTION OF THE DRAWINGS

So that the manner in which the above recited features of embodiments can be understood in detail, a more particular description of embodiments, briefly summarized above, may be had by reference to embodiments, some of which are illustrated in the appended drawings. It is to be noted, however, that the appended drawings illustrate only typical embodiments and are therefore not to be considered limiting of scope, for other equally effective embodiments may be admitted.

To facilitate understanding, identical reference numerals have been used, where possible, to designate identical elements that are common to the figures. It is contemplated that elements of one embodiment may be beneficially incorporated in other embodiments.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Figure 1:
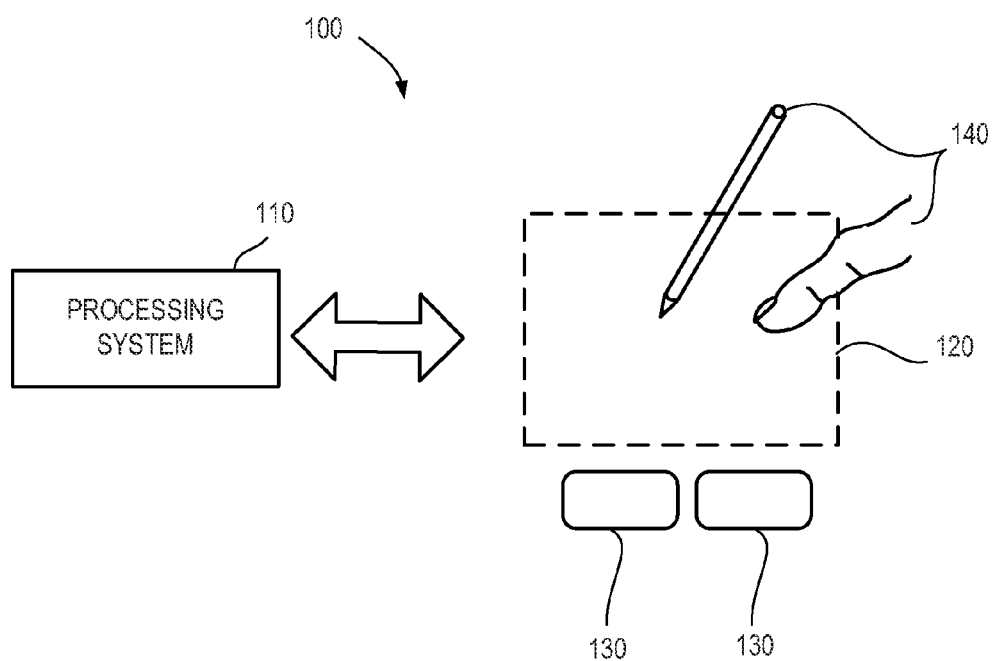
FIG. 1 is a block diagram of a system that includes an input device according to embodiments.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
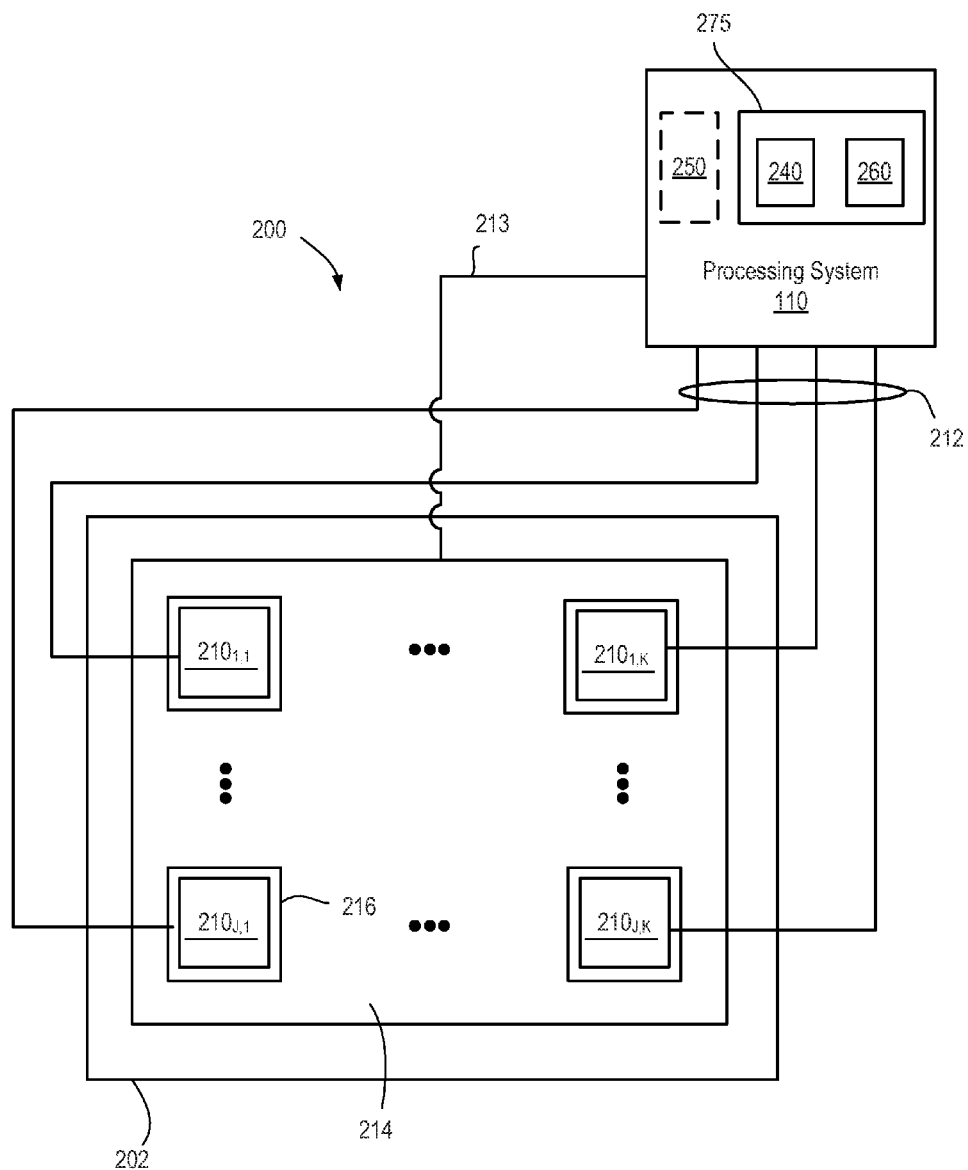
FIG. 2 is a block diagram depicting a capacitive sensor device 200 according to embodiments.

FIG. 2 is a block diagram depicting a capacitive sensor device 200 according to embodiments. The capacitive sensor device 200 comprises an example implementation of the input device 100 shown in FIG. 1. The capacitive sensor device 200 includes sensor electrodes disposed on a substrate 202. In the present example, the sensor electrodes comprise a plurality of sensor electrodes $210_{1,1}$ through $210_{J,K}$, where J and K are integers, and a grid electrode 214. The sensor electrodes 210 are ohmically isolated from each other and the grid electrode 214. The sensor electrodes 210 can be separated from the grid electrode 214 by a gap 216. In the present example, the sensor electrodes 210 are arranged in a rectangular matrix pattern, where at least one of J or K is greater than zero. The sensor electrodes 210 can be arranged in other patterns, such as polar arrays, repeating patterns, non-repeating patterns, or like type arrangements. The sensor electrodes 210 are coupled to the processing system 110 by conductive routing traces 212. In some examples, the grid electrode 214 can be coupled to the processing system 110 by a conductive routing trace 213.

In some examples, the sensor electrodes can be disposed on separate layers of the substrate 202. In other examples, the sensor electrodes can be disposed on a single layer of the substrate 202. While the sensor electrodes 210 and the grid electrode 214 are shown disposed on a single substrate 202, in some embodiments, the electrodes of the capacitive sensor device 200 can be disposed on more than one substrate. For example, some sensor electrodes can be disposed on a first substrate, other sensor electrodes can be disposed on a second substrate adhered to the first substrate, and the grid electrode can be disposed on the first, second, and/or yet another substrate. The sensor electrodes 210 can have the same or different widths, sizes and/or shapes. While the grid electrode 214 is shown as a single electrode, in some examples, the grid electrode 214 can be divided into a plurality of segments.

In a first mode of operation, the processing system 110 can operate the sensor electrodes to detect the presence of input object(s) 140 via absolute sensing techniques. That is, the processing system 110 is configured to operate the sensor electrodes to measure self-capacitance and changes thereof over time. The processing system 110 can determine position of the input object(s) 140 based changes in self-capacitance (absolute sensing).

In a second mode of operation, the processing system 110 can operate the sensor electrodes to detect presence of input object(s) 140 via transcapacitive sensing techniques. That is, the sensor electrodes 210 can be split into groups of transmitter and receiver electrodes. The processing system 110 can drive transmitter electrodes with transmitter signals and receive resulting signals from receiver electrodes. The resulting signals comprise effects of input object(s) 140. The processing system 110 measures mutual capacitance and changes thereof over time from the resulting signals. The processing system 110 can determine position of the input object(s) 140 based on changes in mutual capacitance (transcapacitive sensing).

In a third mode of operation, the processing system 110 can operate the sensor electrodes to detect presence of an input object 140 comprising an active pen. An active pen transmits a signal ("active pen signal"). The active pen signal can be a modulated signal having a particular frequency, phase, amplitude, shape, etc. In some embodiments, the active pen periodically transmits the active pen signal according to a particular duty cycle. In a transmission period, the active pen transmits the active pen signal. In an idle period, the active pen does not transmit the active pen signal. The active pen signal is received by the sensor electrodes of the capacitive sensor device 200. The processing system 110 measures changes in the resulting signals, which comprise effects corresponding to the active pen signal and can determine position of the active pen based on such changes in capacitance.

The capacitive sensor device 200 can operate in any one of the modes described above. The capacitive sensor device 200 can also switch between any two or more of the modes described above. In one embodiment, the capacitive sensor device 200 can operate in multiple modes within an overlapping time period, for example, by performing capacitance sensing of input object(s) while performing sensing of an active pen.

In some embodiments, the capacitive sensor device 200 performs sensing periodically according to a particular duty cycle. During a sensing period, the processing system 100 can operate in any of the modes described above. During a non-sensing period, the processing system 110 may perform other operations (e.g., display updating) or may be idle. In some embodiments, described below, the capacitive sensor device 200 continuously senses an active pen in both the sensing and non-sensing periods.

The processing system 110 can include one or more modules, such as a sensor module 240 and a determination module 260. The sensor module 240 and the determination module 260 comprise modules that perform different functions of the processing system 110. In other examples, different configurations of modules can perform the functions described herein. The sensor module 240 and the determination module 260 can include sensor circuitry 270 and can also include firmware, software, or a combination thereof operating in cooperation with the sensor circuitry 270. In some embodiments, the processing system 110 can include a display driver module 250.

In an embodiment, the sensor module 240 includes sensor circuitry 275 that can excite or drive sensor electrodes with signals. The terms "excite" and "drive" as used herein encompasses controlling some electrical aspect of the driven element. For example, it is possible to drive current through a wire, drive charge into a conductor, drive a substantially constant or varying voltage waveform onto an electrode, etc.

The sensor module 204 can drive a sensor electrode using a modulated signal generally having a shape, frequency, amplitude, and phase. The sensor module 204 can also measure some electrical aspect of a driven element indicative of capacitance (e.g., charge, voltage, current). The sensor module 204 can drive a sensor electrode and then measure changes of capacitive load on the sensor electrode (i.e., changes in absolute capacitance). The sensor module 204 can drive a transmitter electrode to transmit a transmitter signal and then measure changes in mutual capacitance from a resulting signal on a receiver electrode (i.e., changes in transcapacitance). The sensor module 204 can also hold sensor electrodes at a substantially constant voltage for detecting an active pen signal. The sensor module 204 can also receive an active pen signal while the sensor electrodes are modulated. The sensor module 204 can also drive one or more electrodes with a shield signal (e.g., a substantially constant voltage or varying voltage (guard signal)). In general, the sensor module 240 obtains capacitive sensing signals derived from operating the sensor electrodes for either transcapacitive sensing or absolute capacitive sensing.

The sensor module 240 generates measurements of some characteristic of the capacitive sensing signals, such as voltage, current, charge, or the like. The determination module 260 receives the measurements from the sensor module 240. The determination module 260 derives information from the measurements. For example, the determination module 260 can determine a baseline capacitance for the sensor electrode pattern, determine changes in mutual capacitance between sensor electrodes and/or changes in self-capacitance of sensor electrodes, and compare changes in capacitance with the baseline to detect object presence, position, motion, etc. The changes in capacitance can be associated with specific locations of the sensing region 120 to create a "capacitive image" or "capacitive frame." The changes in capacitance can be associated with a specific axis of the sensing region 120 to create a "capacitive profile" along that axis. When compensated with the baseline, the capacitive image(s) and/or capacitive profile(s) enable the sensing of contact, hovering, or other user input with respect to the formed sensing regions by the sensor electrode pattern. The determination module 260 can determine positional information, size, type, and the like of input object(s).

In some touch screen embodiments, one or more of the sensor electrodes on the substrate 202 comprise one or more display electrodes used in updating the display of a display screen. In one or more embodiments, the display electrodes comprise one or more segments of a Vcom electrode (common voltage electrode), a source drive line, gate line, an anode electrode or cathode electrode, or any other display element. These display electrodes may be disposed on an appropriate display screen substrate. For example, the display electrodes may be disposed on the a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode", since it performs multiple functions. The processing system 110 can include the display driver module 250 configured to drive electrodes on the substrate 202 for display updating. The display driver module 250 includes circuitry configured to provide display image update information to a display device during a display update period.

Alternatively, the display driver module 250 can be in a device separate from the processing system 110 and coupled to the processing system 110.

In some embodiments, capacitive sensing and display updating occur during non-overlapping periods. Each cycle of the sensing period can occur between consecutive cycles of the display update period. During the display update period, display lines of a display frame are updated. A cycle of the sensing period can occur between display line updates, which may be referred to as a horizontal blanking period or h-blanking period. In some embodiments, the horizontal blanking period can be lengthened and referred to as a long horizontal blanking period, long h-blanking period, or distributed blanking period. The long h-blanking period can be at least as long as the display update period. In other embodiments, a cycle of the sensing period can occur between display frame updates, which may be referred to as a vertical blanking period or v-blanking period. The processing system 110 can operate sensor electrodes on the substrate 202 for capacitive sensing during any cycle of the sensing period. As described herein, the processing system 110 can also operate the sensor electrodes on the substrate 202 for sensing an active pen during any cycle of the sensing period or the display update period.

Figure 3A:
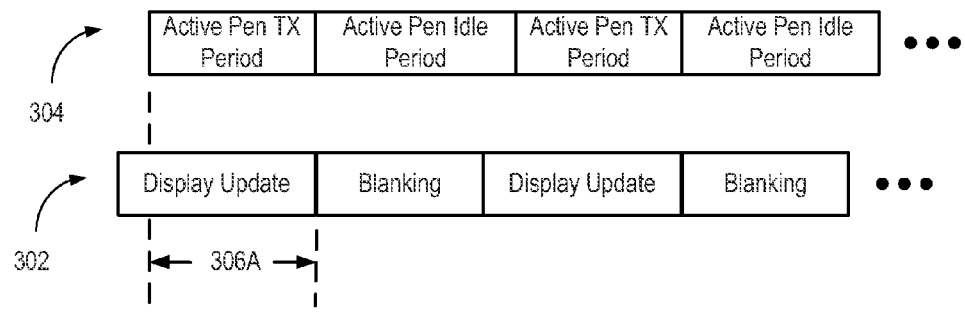
FIG. 3A illustrates a general relationship between display updating and active pen transmission.

FIG. 3A illustrates a general relationship between display updating and active pen transmission. As noted above, an active pen can alternate between transmitting an active pen signal and not transmitting the active pen signal (e.g., idling). An active pen duty cycle 304 generally includes a transmission period and an idle period. During cycles of the transmission period, the active pen transmits the active pen signal. During cycles of the idle period, the active pen does not transmit the active pen signal. A display update duty cycle 302 generally includes a display update period and a blanking period (e.g., an h-blanking period or long h-blanking period, as shown). During cycles of the display update period, display lines are updated. During cycles of the blanking period, display lines are not updated. Also, during cycles of the blanking period, the processing system 110 can perform capacitive sensing. Thus, the sensing period can occur within the blanking period (e.g., the sensing period can be approximately equal to, or shorter than, the blanking period).

As shown in FIG. 3A, the active pen duty cycle 304 is asynchronous with the display update duty cycle 302. Generally, there is a phase difference 306A between the active pen transmission period and the blanking period. In a worst case, the phase difference 306A is such that the active pen transmission period occurs completely within the display update period. That is, the active pen is not transmitting during the blanking period. In such case, the active pen signal is not available for sensing by the processing system 110 during the sensing period within the blanking period. If the processing system 110 only sensed the active pen during the sensing period, the active pen would not be detected in this worst case scenario. In other cases, the phase difference 306A can be such that only a portion of the active pen transmission period occurs during the blanking period. While this may allow the processing system 110A to detect the active pen (depending on the length over the overlap), such portion is insufficient for sensing and tracking the active pen during the entire sensing period.

Figure 3B:
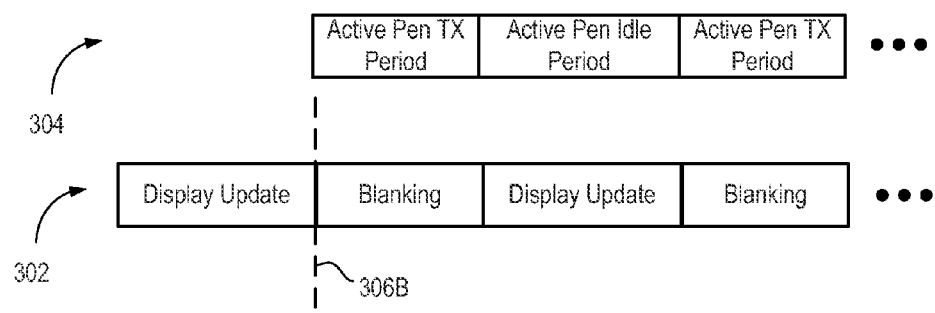
FIG. 3B illustrates an aligned relationship between display updating and active pen transmission.

FIG. 3B illustrates an aligned relationship between display updating and active pen transmission. As shown in FIG. 3B, a phase difference 306B between the active pen transmission period and the blanking period is at or near zero. Thus, the active pen transmission period occurs within the blanking period and, accordingly, within the sensing period. The active pen transmission period can be equal to, longer, or shorter than the sensing period. If the active pen transmission period is at least equal to the sensing period, after alignment the processing system 110 can sense the active pen during the entire sensing period. If the active pen transmission period is shorter than the sensing period, after alignment the processing system 110 can sense the active pen during the entire active pen transmission period.

As described herein, to align the active pen transmission period and the display update period, the processing system 110 can monitor for the active pen signal in both the display update period and the blanking period of the display update duty cycle 302. The processing system 110 is also configured with knowledge of the length of the active pen transmission period. Upon detection of the active pen signal, the processing system 110 adjusts the phase difference between the active pen transmission period and the sensing period to be substantially aligned (e.g., as shown in FIG. 3B). For example, the processing system 110 can control a display driver module to adjust the blanking period to be aligned with the active pen transmission period. In examples described herein, the sensing period is assumed to begin at the start of the blanking period. Hence, alignment with the blanking period is substantially equivalent to alignment with the sensing period. If the sensing period begins some time after the blanking period, the active pen transmission period is aligned with the sensing period.

Figure 4:
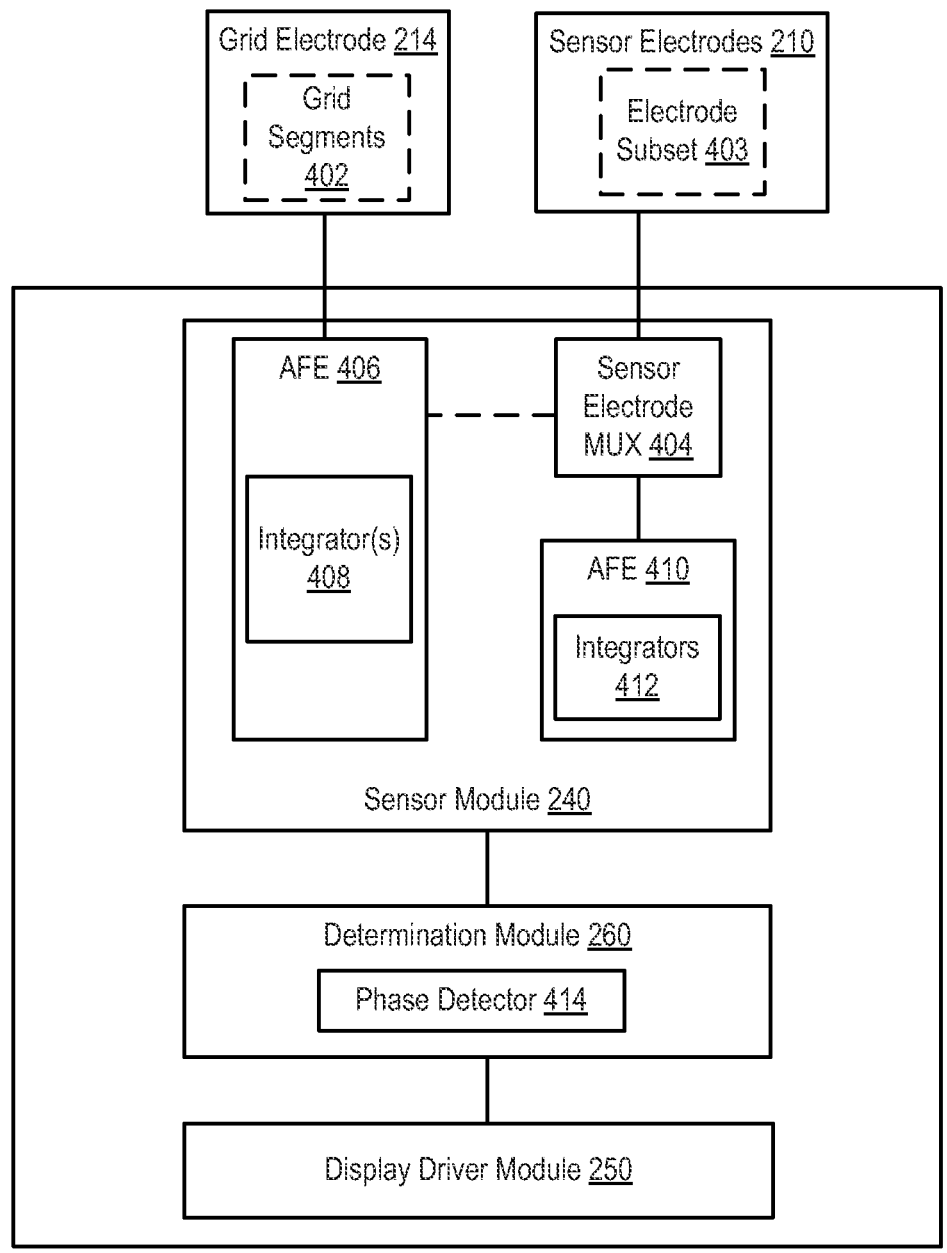
FIG. 4 is a block diagram illustrating the processing system in more detail according to embodiments.

FIG. 4 is a block diagram illustrating the processing system 110 in more detail according to embodiments. The processing system 110 includes the sensor module 240. The sensor module 240 includes sensor circuitry such as an analog front end (AFE) 406 coupled to the grid electrode 214. The AFE 406 can include one or more integrators 408 coupled to the grid electrode 214. In some embodiments, the grid electrode 214 can include a plurality of segments 402. The segments 402 can be coupled to a single integrator 408 or individually to a plurality of integrators 408. The sensor module 240 includes a sensor electrode multiplexer (MUX) 404 coupled to the sensor electrodes 210. The sensor electrode MUX 404 is configured to couple the sensor electrodes 210 to integrators 412 in an AFE 410. The sensor electrode MUX 404 can be configured to couple any subset of the sensor electrodes 210 to any of the integrators 412, where a subset of sensor electrodes includes one or more of the sensor electrodes.

The integrator(s) 408 and the integrators 312 are configured to integrate some characteristic of the electrodes, such as charge, voltage, current, etc. over time. For example, the AFE 406 can couple a voltage to the grid electrode 214 and the integrator(s) 408 can integrate charge over time. Likewise, the AFE 406 can couple a voltage to the sensor electrodes 210 and the integrators 412 can integrate charge over time. The AFE 406 and the AFE 410 can sample, demodulate, filter, etc. the integrated signals output by the integrator(s) 408 and the integrators 412 to generate measurement signals.

The determination module 260 processes the measurement signals. The determination module 260 can process the measurement signals using absolute sensing, transcapacitive sensing, or active pen sensing to detect input object(s). The determination module 260 can control the sensor module 240 to generate the measurements of interest based on the current mode of operation. The determination module 260 can, in some embodiments, perform both input sensing (absolute or transcapacitive) and active pen sensing concurrently.

In an embodiment, the determination module 260 controls the AFE 406 to receive an active pen signal using the grid electrode 214. The determination module 260 can detect presence of an active pen based on the active pen signal received by the AFE 406. For example, the AFE 406 can receive the active pen signal by measuring current supplied to maintain the grid electrode 214 at a target voltage (e.g., a substantially constant voltage). For example, the target voltage can be Vcom (i.e., the common voltage of the display). When an active pen is transmitting an active pen signal, the active pen signal is capacitively coupled to the grid electrode 214. The AFE 406 supplies current to the grid electrode 214 to maintain the grid electrode 214 at the target voltage. The integrator(s) 408 integrate the supplied current over time. When the active pen is not transmitting the active pen signal, AFE 406 supplies a baseline current to the grid electrode 214. The determination module 260 can process measurements produced by the AFE 406 to detect changes from the baseline, which is indicative of the active pen signal.

If the grid electrode 214 is not segmented, the AFE 406 can be used to detect presence of the active pen signal. If the grid electrode 214 include segments 402, and the AFE 406 includes an integrator 408 coupled to each of the segments, measurements from the AFE 406 can be used to both detect presence of the active pen signal and to determine position of the active pen relative to the segments 402.

In an embodiment, the grid electrode 214 (or segments 402 thereof) is not used to update the display during the display update period. Thus, the determination module 260 can control the AFE 406 to receive the active pen signal during the display update period. The determination module 260 can also control the AFE 406 to receive the active pen signal during the sensing period. Touch sensing can be performed using the sensor electrodes 210, while active pen sensing is performed using the grid electrode 214 (or segments 402 thereof). In this manner, the determination module 260 can both perform touch sensing and active pen sensing concurrently. By detecting the active pen signal, the determination module 206 can determine the phase of the active pen duty cycle regardless of how the active pen transmission period is aligned with the blanking period (sensing period).

The determination module 260 can include a phase detector 414 to track the phase of the active pen duty cycle. The determination module 260 can adjust the sensing period for alignment with the transmission period of the active pen signal. In an embodiment, the display module 260 controls the display driver module 250 to adjust the blanking period to be substantially aligned with the active pen transmission period based on output of the phase detector 414.

In another embodiment, the determination module 260 can control the sensor module 240 to receive the active pen signal using a subset 403 of the sensor electrodes 210. In such embodiment, the sensor module 240 can be configured such that the sensor electrode MUX 404 is coupled to the AFE 406. The sensor electrode MUX 404 is configured to couple the electrode subset 403 to the AFE 406 for receiving the active pen signal. In such a configuration, the connection between the grid electrode 214 and the AFE 406 can be omitted. The AFE 406 can couple each sensor electrode in the selected subset 403 to an integrator 408. Measurements from the AFE 406 can be used to both detect presence of the active pen signal and to determine position of the active pen relative to the electrode subset 403 used to receive the active pen signal.

For example, the AFE 406 can receive the active pen signal by measuring current supplied to maintain the selected electrode subset 403 at a target voltage (e.g., a substantially constant voltage). For example, the target voltage can be Vcom. When an active pen is transmitting an active pen signal, the active pen signal is capacitively coupled to the selected electrode subset 403. The AFE 406 supplies current to the selected electrode subset 403 to maintain them at the target voltage. The integrators 408 integrate the supplied current over time. When the active pen is not transmitting the active pen signal, AFE 406 supplies a baseline current to the selected electrode subset 403. The determination module 260 can process measurements produced by the AFE 406 to detect changes from the baseline, which is indicative of the active pen signal.

In an embodiment, the selected electrode subset 403 is not used to update the display during the display update period. Thus, the determination module 260 can control the AFE 406 to receive the active pen signal during the display update period. The determination module 260 can also control the AFE 406 to receive the active pen signal during the sensing period. Touch sensing can be performed using those sensor electrodes 210 other than the selected electrode subset 403. In this manner, the determination module 260 can both perform touch sensing and active pen sensing concurrently. Thus, the determination module 206 can determine the phase of the active pen duty cycle regardless of how the active pen transmission period is aligned with the blanking period (sensing period).

In an embodiment, the selected electrode subset 403 used to receive the active pen signal comprises a static spatial arrangement of the sensor electrodes 210. For example, a checker-board pattern or the like can be employed. Alternatively, the determination module 260 can dynamically select the electrode subset 403 used to receive the active pen signal. For example, different subsets can be selected as the active pen moves through the sensing area.

Figure 5:
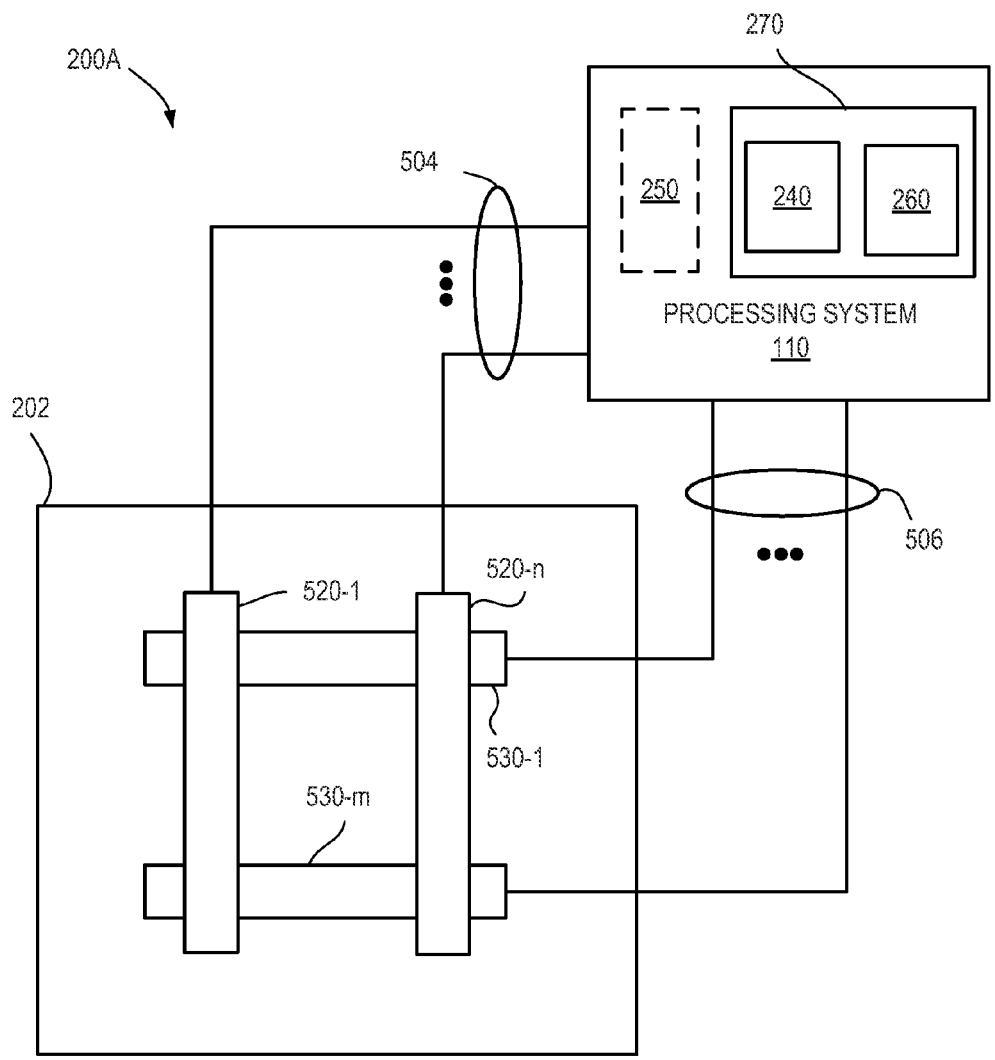
FIG. 5 is a block diagram depicting another capacitive sensor device according to embodiments.

FIG. 5 is a block diagram depicting another capacitive sensor device 200A according to embodiments. The capacitive sensor device 200A comprises an example implementation of the input device 100 shown in FIG. 1. The capacitive sensor device 200A includes sensor electrodes disposed on the substrate 202. In the present example, the sensor electrodes include two pluralities of sensor electrodes 520-1 through 520-*n* (collectively "sensor electrodes 520"), and 530-1 through 530-*m* (collectively "sensor electrodes 530"), where m and n are integers greater than zero. The sensor electrodes 520 and 530 are separated by a dielectric (not shown).

In some examples, the sensor electrodes 520 and the sensor electrodes 530 can be disposed on separate layers of the substrate 202. In other examples, the sensor electrodes 520 and the sensor electrodes 530 can be disposed on a single layer of the substrate 202. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate. The sensor electrodes 520, 530 can have the same or different widths, sizes and/or shapes.

In the present example, the sensor electrode pattern is shown with the sensor electrodes 520, 530 arranged in an x/y grid of bars and strips. It is to be understood that the sensor electrode pattern is not limited to such bars and stripes arrangement, but instead can include numerous sensor patterns. For example, the sensor electrodes on the substrate 202 can be arranged in a matrix pattern of sensor electrodes surrounded by a grid electrode. Although the sensor electrode pattern is depicted as rectangular, the sensor electrode pattern can have other shapes, such as a circular shape.

The sensor electrodes 520 and 530 are coupled to the processing system 110 by conductive routing traces 504, 506. When in operation, the processing system 110 is coupled to the sensor electrodes 520, 530 through the conductive routing traces 504, 506 to implement the sensing region 120 for sensing inputs. In an embodiment, each set of sensor electrodes can have a dedicated function. For example, the sensor electrodes 530 can transmit transmitter signals generated by the processing system 110 or another device under control of the processing system 110. The processing system 110 can receive resulting signals with the sensor electrodes 520. In such an embodiment, the sensor electrodes 530 are "transmitter electrodes" and the sensor electrodes 520 are "receiver electrodes." In some embodiments, one or more of the sensor electrodes 520 may be measured to sense self-capacitance (absolute capacitance). In another embodiment, the sets of sensor electrodes do not have a dedicated function (undifferentiated electrodes) and the sensor electrodes 530 can function as either transmitter electrodes or receiver electrodes, and the sensor electrodes 520 can function as either receiver electrodes or transmitter electrodes.

In some embodiments, the determination module 260 can control the sensor module 240 to receive an active pen signal using the sensor electrodes 520 in a manner similar to receiving the active pen signal using the grid electrode 214 (or segments thereof) and the selected subset of sensor electrodes 210. In an embodiment, the sensor electrodes 520 can include receiver electrodes that are not used to update a display during the display update period. In other embodiments, the determination module 260 can control the sensor module 240 to receive an active pen signal using the sensor electrodes 530 (e.g., transmitter electrodes not used to update a display during the display update period).

Figure 6:
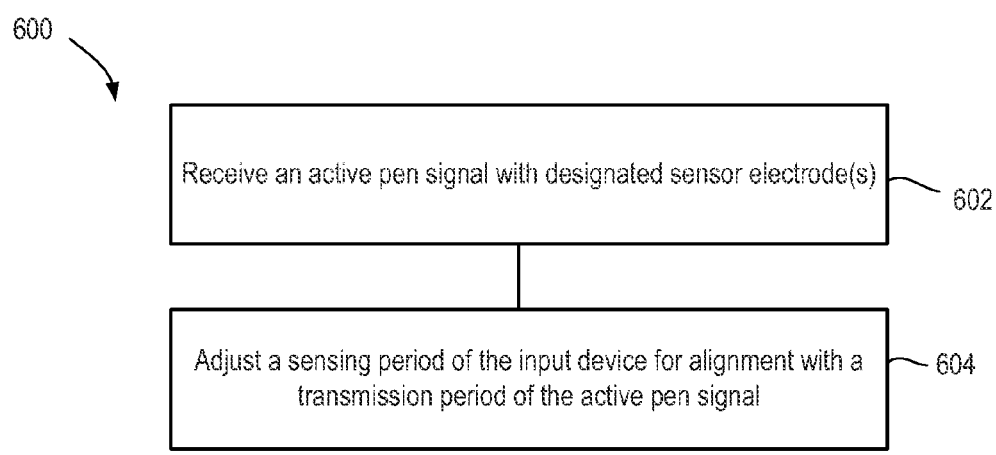
FIG. 6 is a flow diagram depicting a method of operating an input device integrated with a display according to embodiments.

FIG. 6 is a flow diagram depicting a method 600 of operating an input device integrated with a display according to embodiments. The method 600 can be performed by the capacitive sensor device 200 or the capacitive sensor device 200A described above. The method 600 begins at step 602, where the processing system 110 receives an active pen signal with designated sensor electrode(s). In an embodiment, the designated sensor electrode(s) include a grid electrode 214 or segments 402 of a grid electrode 214 disposed between sensor electrodes 210. In another embodiment, the designated sensor electrode(s) include a selected subset of the sensor electrodes 210 circumscribed by the grid electrode 214. In another embodiment, the designated sensor electrode(s) include a selected set of sensor electrodes in bars and stripes type sensor (e.g., FIG. 5), such as the receiver electrodes 520 or the transmitter electrodes 530. The active pen signal can be received during a display update period, during a sensing period, or both. The active pen signal can be received using designated sensor electrode(s) not used to update a display. The active pen signal can be received concurrently with touch sensing using other sensor electrodes.

At step 604, the processing system 110 adjusts the sensing period of the input device for alignment with a transmission period of the active pen signal. This allows the processing system 110 to sense the entire active pen transmission period during the sensing period, or sense the active pen transmission during the entire sensing period (depending on which is longer). In an embodiment, the processing system 110 controls a display driver module (e.g., the display driver module 250 within the processing system 110 or an external display driver module) to adjust the blanking period to be aligned with the active pen transmission period.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for an integrated display and capacitive sensing device, comprising:
   a sensor module including sensor circuitry configured to be coupled to a plurality of sensor electrodes, the sensor module configured to receive an active pen signal with at least one sensor electrode of the plurality of sensor electrodes; and
   a determination module configured to adjust a blanking period for the integrated display for alignment with a transmission period of the active pen signal in response to receiving the active pen signal.

2. The processing system of claim 1, wherein the sensor module is further configured to detect presence of an active pen based on the received active pen signal.

3. The processing system of claim 1, wherein the at least one sensor electrode comprises a grid electrode disposed between at least two sensor electrodes of the plurality of sensor electrodes.

4. The processing system of claim 3, wherein the grid electrode comprises a plurality of segments, and wherein the sensor module is configured to receive the active pen signal with the at least one sensor electrode by receiving the active pen signal with at least two segments of the plurality of segments.

5. The processing system of claim 1, wherein the sensor module is further configured to receive the active pen signal by measuring current supplied to maintain the at least one sensor electrode at a target voltage.

6. The processing system of claim 1, wherein the plurality of sensor electrodes comprises a grid electrode, and wherein the at least one sensor electrode comprises at least two sensor electrodes circumscribed by the grid electrode and wherein the sensor module is configured to receive the active pen signal concurrently with the at least two sensor electrodes.

7. The processing system of claim 1, wherein the plurality of sensor electrodes comprise at least one electrode used to update the display and at least one electrode not used to update the display, and wherein the at least one sensor electrode comprises the at least one electrode not used to update the display.

8. The processing system of claim 1, wherein the sensor module is configured to receive the active pen signal during a display update period.

9. The processing system of claim 1, wherein the sensor module is configured to receive the active pen signal by measuring current supplied to maintain the at least one sensor electrode at a target voltage while capacitive sensing using sensor electrodes in the plurality of sensor electrodes other than the at least one sensor electrode.

10. An input device integrated with a display, the input device comprising:
    a plurality of sensor electrodes; and a processing system, coupled to the plurality of sensor electrodes, configured to:
receive an active pen signal with at least one sensor electrode of the plurality of sensor electrodes; and
adjust a blanking period for the display for alignment with a transmission period of the active pen signal in response to receiving the active pen signal.

11. The input device of claim 10, wherein the processing system is further configured to detect presence of an active pen based on the received active pen signal.

12. The input device of claim 10, wherein the at least one sensor electrode comprises a grid electrode disposed between at least two sensor electrodes of the plurality of sensor electrodes.

13. The input device of claim 12, wherein the grid electrode comprises a plurality of segments, and wherein the processing system is configured to receive the active pen signal with at least two segments of the plurality of segments.

14. The input device of claim 11, wherein the processing system is further configured to receive the active pen signal by measuring current supplied to maintain the at least one sensor electrode at a target voltage.

15. The input device of claim 10, wherein the plurality of sensor electrodes comprises a grid electrode, wherein the at least one sensor electrode comprises at least two sensor electrodes circumscribed by the grid electrode, and wherein the processing system is configured to receive the active pen signal concurrently with the at least two sensor electrodes.

16. The input device of claim 11, wherein the plurality of sensor electrodes comprises at least one electrode used to update the display and at least one electrode not used to update the display, and wherein the at least one sensor electrode comprises the at least one electrode not used to update the display.

17. The input device of claim 11, wherein the processing system is configured to receive the active pen signal during a display update period.

18. A method of operating an input device integrated with a display, the method comprising:
receiving an active pen signal with at least one sensor electrode of a plurality of sensor electrodes; and
adjusting a blanking period for the display for alignment with a transmission period of the active pen signal in response to receiving the active pen signal.

19. The method of claim 18, wherein the plurality of sensor electrodes comprises at least one electrode used to update the display and at least one electrode not used to update the display, and wherein the at least one sensor electrode comprises the at least one electrode not used to update the display.

20. The method of claim 18, wherein the active pen signal is received during a display update period.

21. The processing system of claim 1, wherein the blanking period is between display update periods of a display frame.

22. The processing system of claim 1, wherein the determination module is configured to adjust the blanking period by adjusting a phase difference between the active pen transmission period and the blanking period.

23. The method of claim 18, wherein the blanking period is between display update periods of a display frame.

24. The method of claim 18, wherein the step of adjusting the blanking period comprises adjusting a phase difference between the active pen transmission period and the blanking period.

* * * * *